(12) United States Patent
Anderson et al.

(10) Patent No.: US 7,633,670 B2
(45) Date of Patent: Dec. 15, 2009

(54) METHODS, SYSTEMS, AND DEVICES FOR STEERING OPTICAL BEAMS

(75) Inventors: Betty Lise Anderson, Gahanna, OH (US); Victor Argueta-Diaz, Mexico City (MX); Carolyn Warnky, Westerville, OH (US)

(73) Assignee: The Ohio State University, Columbus, OH (US)

( * ) Notice: Subject to any disclaimer, the term of this patent is extended or adjusted under 35 U.S.C. 154(b) by 388 days.

(21) Appl. No.: 11/184,536

(22) Filed: Jul. 18, 2005

(65) Prior Publication Data

US 2006/0061893 A1 Mar. 23, 2006

Related U.S. Application Data

(60) Provisional application No. 60/588,731, filed on Jul. 16, 2004.

(51) Int. Cl.
*G02B 26/00* (2006.01)
(52) U.S. Cl. .................................... 359/290; 359/237
(58) Field of Classification Search ................ 359/290, 359/291, 292, 295, 298, 220, 223, 224, 320, 359/237, 245, 246, 247, 618, 619, 629, 583; 385/2, 14, 16, 18, 40, 42
See application file for complete search history.

(56) References Cited

U.S. PATENT DOCUMENTS 3,428,391 A 2/1969 Newcomer
3,463,571 A 8/1969 Boehm et al.
3,755,676 A 8/1973 Kinsel
3,892,468 A 7/1975 Duguay
4,225,938 A 9/1980 Turpin
4,344,671 A 8/1982 Lang
4,474,434 A 10/1984 Carlsen et al.
4,474,435 A 10/1984 Carlsen et al.
4,546,249 A 10/1985 Whitehouse et al.
4,929,956 A 5/1990 Lee et al.
5,018,816 A 5/1991 Murray et al.
5,018,835 A 5/1991 Dorschner
5,117,239 A 5/1992 Riza
5,231,405 A 7/1993 Riza (Continued)

FOREIGN PATENT DOCUMENTS

JP 10333089 A2 12/1998

(Continued)

OTHER PUBLICATIONS

U.S. Appl. No. 11/182,111, Non-final Office Action, mailed Jan. 15, 2008.

(Continued)

*Primary Examiner*—Scott J Sugarman
*Assistant Examiner*—Tuyen Q Tra
(74) *Attorney, Agent, or Firm*—Calfee, Halter & Griswold LLP

(57) ABSTRACT

Devices and methods are provided for steering optical beams. The devices use arrays and at least one optical element to steer an input beam to a desired location. Additionally, devices and methods are provided for changing the array dimensions of arrays of input beam positions. The devices use arrays and a plurality of optical elements to rearrange an input array.

29 Claims, 10 Drawing Sheets

U.S. PATENT DOCUMENTS

| | | | |
|---|---|---|---|
| 5,274,385 A | 12/1993 | Riza | |
| 5,276,758 A | 1/1994 | Hughes | |
| 5,319,477 A | 6/1994 | DeJule | |
| 5,329,118 A | 7/1994 | Riza | |
| 5,418,880 A | 5/1995 | Lewis et al. | |
| 5,463,497 A | 10/1995 | Muraki et al. | |
| 5,465,175 A | 11/1995 | Woodgate et al. | |
| 5,475,525 A | 12/1995 | Tournois et al. | |
| 5,512,907 A | 4/1996 | Riza | |
| 5,592,333 A | 1/1997 | Lewis | |
| 5,623,360 A | 4/1997 | Gesell et al. | |
| 5,724,163 A | 3/1998 | David | |
| 5,726,752 A | 3/1998 | Uno et al. | |
| 5,767,956 A | 6/1998 | Yoshida | |
| 5,852,693 A | 12/1998 | Jeong | |
| 5,859,967 A | 1/1999 | Kaufeld et al. | |
| 5,936,759 A | 8/1999 | Buttner | |
| 5,973,727 A | 10/1999 | McGrew et al. | |
| 6,014,244 A | 1/2000 | Chang | |
| 6,040,880 A | 3/2000 | Tsuboi | |
| 6,064,506 A | 5/2000 | Koops | |
| 6,181,367 B1 | 1/2001 | McGrew et al. | |
| 6,188,817 B1 | 2/2001 | Goodfellow | |
| 6,236,506 B1 | 5/2001 | Cao | |
| 6,266,176 B1 | 7/2001 | Anderson et al. | |
| 6,323,981 B1 | 11/2001 | Jensen | |
| 6,388,815 B1 | 5/2002 | Collins, Jr. et al. | |
| 6,429,976 B1 * | 8/2002 | Yamamoto et al. | 359/641 |
| 6,480,323 B1 | 11/2002 | Messner et al. | |
| 6,522,404 B2 | 2/2003 | Mikes et al. | |
| 6,525,889 B1 | 2/2003 | Collins, Jr. et al. | |
| 6,535,340 B1 | 3/2003 | Saruwatari | |
| 6,637,899 B2 | 10/2003 | Sunaga et al. | |
| 6,647,164 B1 | 11/2003 | Weaver et al. | |
| 6,674,939 B1 | 1/2004 | Anderson et al. | |
| 6,711,316 B2 | 3/2004 | Ducellier | |
| 6,724,535 B1 | 4/2004 | Clabburn | |
| 6,724,951 B1 | 4/2004 | Anderson et al. | |
| 6,734,955 B2 | 5/2004 | Wight et al. | |
| 6,760,140 B1 | 7/2004 | Argueta-Diaz et al. | |
| 6,816,307 B1 | 11/2004 | Sun | |
| 6,922,277 B2 * | 7/2005 | Moon et al. | 359/298 |
| 6,934,069 B2 | 8/2005 | Moon et al. | |
| 6,952,306 B1 | 10/2005 | Anderson | |
| 6,958,861 B1 | 10/2005 | Argueta-Diaz | |
| 7,171,068 B2 * | 1/2007 | Bartlett et al. | 385/17 |
| 7,215,474 B2 | 5/2007 | Argueta-Diaz | |
| 7,236,238 B1 | 6/2007 | Durresi et al. | |
| 2002/0030814 A1 | 3/2002 | Mikes et al. | |
| 2003/0202731 A1 | 10/2003 | Ionov et al. | |
| 2004/0190823 A1 | 9/2004 | Leuthold et al. | |
| 2005/0007668 A1 | 1/2005 | Serati et al. | |
| 2006/0034567 A1 | 2/2006 | Anderson et al. | |
| 2006/0044987 A1 | 3/2006 | Anderson et al. | |
| 2006/0061893 A1 | 3/2006 | Anderson et al. | |
| 2006/0062517 A1 | 3/2006 | Anderson et al. | |
| 2006/0114568 A1 | 6/2006 | Argueta-Diaz | |

FOREIGN PATENT DOCUMENTS

| | | |
|---|---|---|
| WO | WO 01/14924 A1 | 3/2001 |
| WO | WO 02/29436 A1 | 4/2002 |
| WO | WO 03/075048 A2 | 9/2003 |
| WO | WO 03/083521 A2 | 10/2003 |
| WO | WO 03/083541 A2 | 10/2003 |

OTHER PUBLICATIONS

U.S. Appl. No. 11/184,535, Final Office Action, mailed Oct. 15, 2007.

Chiou et al., A Mirror Device with Tilt and Piston Motions, Oct. 1999, SPIE, vol. 3893, pp. 298-303.

U.S. Appl. No. 09/645,136, Non-final Office Action, mailed Aug. 15, 2001.

U.S. Appl. No. 09/645,136, Notice of Allowance and Fee(s) Due and Notice of Allowability with Examiner's Statement of Reasons for Allowance, mailed Feb. 26, 2002.

U.S. Appl. No. 09/688,478, Non-final Office Action, mailed Jan. 20, 2002.

U.S. Appl. No. 09/688,478, Notice of Allowance and Fee(s) Due and Notice of Allowability with Examiner's Statement of Reasons for Allowance, mailed Jul. 2, 2002.

U.S. Appl. No. 09/688,904, Notice of Allowance and Issue Fee Due and Notice of Allowability with Examiner's Amendment and Examiner's Statement of Reasons for Allowance, mailed Jan. 1, 2001.

U.S. Appl. No. 10/086,355, Non-final Office Action, mailed Feb. 2, 2003.

U.S. Appl. No. 10/086,355, Non-final Office Action, mailed Aug. 13, 2003.

U.S. Appl. No. 10/086,355, Notice of Allowance and Fee(s) Due and Notice of Allowability with Examiner's Amendment, Examiner's Statement of Reasons for Allowance, and Interview Summary, mailed Feb. 18, 2004.

Int'l App. No. PCT/US03/06189, International Search Report, mailed Oct. 20, 2003.

U.S. Appl. No. 10/106,177, Notice of Allowance and Fee(s) Due and Notice of Allowability with Examiner's Statement of Reasons for Allowance, mailed Jun. 12, 2003.

Int'l App. No. PCT/US03/09246, International Search Report, mailed Sep. 4, 2003.

Int'l App. No. PCT/US03/09246, International Preliminary Examination Report, completed Dec. 11, 2003.

U.S. Appl. No. 10/106,776, Non-final Office Action, mailed Jun. 10, 2003.

U.S. Appl. No. 10/106,776, Final Office Action, mailed Nov. 21, 2003.

U.S. Appl. No. 10/106,776, Notice of Allowance and Fee(s) Due and Notice of Allowability, mailed Dec. 11, 2003.

Int'l App. No. PCT/US03/09242, International Search Report, mailed Sep. 23, 2003.

Int'l App. No. PCT/US03/09242, International Preliminary Examination Report, completed Sep. 8, 2004.

U.S. Appl. No. 10/726,770, Non-final Office Action, mailed Aug. 20, 2004.

U.S. Appl. No. 10/726,770, Notice of Allowance and Fee(s) Due and Notice of Allowability with Examiner's Amendment, Examiner's Statement of Reasons for Allowance, and Interview Summary, mailed May 5, 2005.

U.S. Appl. No. 10/726,771, Non-final Office Action, mailed Jan. 1, 2005.

U.S. Appl. No. 10/726,771, Final Office Action, mailed Oct. 6, 2005.

U.S. Appl. No. 10/726,771, Non-final Office Action, mailed Jan. 30, 2006.

U.S. Appl. No. 10/726,771, Notice of Allowance and Fee(s) Due and Notice of Allowability with Examiner's Statement of Reasons for Allowance and Interview Summary, mailed Sep. 12, 2006.

U.S. Appl. No. 10/726,771, Notice of Allowance and Fee(s) Due and Notice of Allowability with Examiner's Statement of Reasons for Allowance, mailed Feb. 28, 2007.

U.S. Appl. No. 10/727,009, Notice of Allowance and Fee(s) Due and Notice of Allowability with Examiner's Statement of Reasons for Allowance, mailed Dec. 7, 2004.

U.S. Appl. No. 10/727,009, Notice of Allowance and Fee(s) Due and Notice of Allowability with Examiner's Statement of Reasons for Allowance, mailed May 24, 2005.

U.S. Appl. No. 11/184,535, Non-final Office Action, mailed Oct. 10, 2006.

U.S. Appl. No. 11/184,535, Non-final Office Action, mailed Apr. 3, 2007.

U.S. Appl. No. 11/183,029, Non-final Office Action, mailed Nov. 20, 2006.

U.S. Appl. No. 11/256,578, Non-final Office Action, mailed Mar. 29, 2006.

U.S. Appl. No. 10/256,578, Notice of Allowance and Fee(s) Due and Notice of Allowability with Examiner's Statement of Reasons for Allowance, mailed Aug. 17, 2006.

U.S. Appl. No. 10/256,578, Notice of Allowance and Fee(s) Due and Notice of Allowability with Examiner's Statement of Reasons for Allowance, mailed Dec. 6, 2006.

Collins et al., An Experimental Numerical Optical Processor (NOP), Digest of Papers for Compcon 78, IEEE catalog No. 78CH1328-4C, San Francisco, CA, Feb. 28-Mar. 3, 1978, pp. 198-199.

Collins, Jr., The Design of Devices for Producing Optically Controlled Incremental Time Delays for Phased Array Radars, National Reconnaissance Office, Contract No. NRO-98-C-6002, Technical Report 736076-1, The Ohio State University, Oct. 1998, 60 pages.

Collins, Jr. et al., True Time Delay with Binary Time Delay for Large Arrays, 1998 Antenna Applications Symposium, Allerton Park, Monticello, IL, Sep. 1998, 13 pages.

Dolphi et al., Experimental Demonstration of a Phased-Array Antenna Optically Controlled with Phase and Time Delays, Applied Optics, vol. 35, No. 26, Sep. 10, 1006, pp. 5293-5300.

Int'l App. No. PCT/US00/23361, International Search Report, mailed Jan. 8, 2001.

Int'l App. No. PCT/US00/23361, International Preliminary Examination Report, completed May 8, 2001.

EP App. No. 00 96 1366, Supplementary European Search Report, completed Apr. 3, 2003.

Bishop et al., The Rise of Optical Switching, Scientific American, Jan. 2001, pp. 88-94.

Hect, Many Approaches Taken for All-Optical Switching, Laser Focus World, www.optoelectronics-world.com, Aug. 2001, 5 pgs.

Webb et al., Stroke Amplifier for Deformable Mirrors, Applied Optics, vol. 43, No. 28, Oct. 1, 2004, pp. 5330-5333.

Zdeblick, Design Variables Prevent a Single Industry Standard, Laser Focus World, www.optoelectronics-world.com, Mar. 2001, 4 pgs.

U.S. Appl. No. 10/726,771, Durresi et al.

Anderson, et al., Increasing Efficiency of Optical Beam Steerers, Draft Technical Report #3 for Harris Corporation, The Ohio State University, May 30, 2003, pp. 1-11.

Anderson et al., Binary-Counting True Time Delay Generator Using a White Cell Design and Deformable Mirror Devices, LEOS, Orlando, FL, Dec. 1998, 2 pgs.

Anderson et al., Design Advances in Free-Space Optical True-Time Delay Device, PSAA-8, Monterey, CA, Jan. 1998, 3 pgs.

Anderson et al., Highly Parallel Optical Device to Produce True Time Delays for Phased Array Antennas, Allerton, Sep. 1998, 14 pgs.

Anderson et al., Optically Produced True-Time Delays for Phased Antenna Arrays, Applied Optics, vol. 36, No. 32, Nov. 20, 1997, pp. 8493-8503.

Anderson et al., Optical Cross-Connect Based on Tip/Tilt Micromirrors in a White Cell, IEEE Journal of Selected Topics in Quantum Electronics, vol. 9, No. 2, Mar./Apr. 2003, pp. 579-593.

Anderson, et al. Optical Interconnection Device Based on the White Cell, presentation at Notre Dame University Nov. 6, 2002, 46 pgs.

Anderson, Optical Interconnections, Optical True-Time Delays, and More . . . , presentation at University of Colorado Jan. 28, 2003, 61 pgs.

Anderson et al., Steering of Optical Beams Using True-Time Delay Based on the White Cell, Optical Society of America, 2005, 4 pgs.

Anderson, et al., Polynomial-based optical true-time delay devices with microelectromechanical mirror arrays, Applied Optics, vol. 41, No. 26, Sep. 10, 2002, pp. 5449-5461.

Argueta-Diaz et al., Binary Optical Interconnection: Patent Disclosure Addendum, Mar. 7, 2005, pp. 1-47.

Argueta-Diaz, et al. Reconfigurable Photonic Switch Based on a Binary System Using the White Cell and Micromirror Arrays, IEEE Journal of Selected Topics in Quantum Electronics, vol. 9, No. 2, Mar./Apr. 2003, pp. 594-602.

Chen et al., 1-to-12 Surface Normal Three-Dimensional Optical Interconnects, Applied Physics Letters 63(14), Oct. 4, 1993, pp. 1883-1885.

Cohen et al., Optically Controlled Serially Fed Phased Array Sensor, IEEE Photonics Technology Letters, vol. 8, No. 12, Dec. 1996, pp. 1683-1685.

Collins et al., Numerical Optical Data Processing, Proceedings of the 1978 International Optical Computing Conference, London, England, Sep. 1978, pp. 194-197.

Collins et al., Optics for Numerical Calculations, Proceedings of ICO-11 Conference, Madrid, Spain, 1978, pp. 311-314.

Collins, Jr. et al., Optical True Time Delay for Phased Array Antennas Based on the White Cell, GOMAC, Monterey, CA, Mar. 1999, 4 pgs.

Collins, Numerical Optical Data Processor, SPIE, vol. 128, Effective Utilization of Optics in Radar Systems, 1977, pp. 313-319.

Ewing et al., Advancements in LCoS Optical Phased Array Technology, BNS Boulder Nonlinear Systems (undated), pp. 1-23.

Fairley et al., The Microphotonics Revolution, Mit's Magazine of Innovation, Technology Review, Jul./Aug. 2000, pp. 38-44.

Freitag et al., A Coherent Optically Controlled Phased Array Antenna System, IEEE Microwave and Guided Wave Letters, vol. 3, No. 9, Sep. 1993, pp. 293-295.

Goutzoulis et al., Hybrid Electronic Fiber Optic Wavelength-Multiplexed System for True Time-Delay Steering of Phased Array Antennas, Optical Engineering, vol. 31, No. 11, Nov. 1992, pp. 2312-2322.

Higgins et al., Design and demonstration of a switching engine for a binary true-time-delay device that uses a White cell, Applied Optics, vol. 42, No. 23, Aug. 10, 2003, pp. 4747-4757.

Kunathikom, et al. Design of Delay Elements in Binary Optical True-Time Delay Device that uses a White Cell, Applied Optics, vol. 42, No. 35, Dec. 10, 2003, pp. 6984-6994.

Li et al., Angular Limitations of Polymer-Based Waveguide Holograms for 1-to-many V-shaped Surface-Normal Optical Interconnects, Applied Physics Letters 65(9), Aug. 29, 1994, pp. 1070-1072.

Liu et al., Cascaded Energy-Optimized Linear Volume Hologram Array for 1-to-many Surface-Normal Even Fan-Outs, Optics and Laser Technology, vol. 29, No. 6, 1997, pp. 321-325.

Rader, et al., Demonstration of a Linear Optical True-time Delay Device by Use of a Microelectromechanical Mirror Array, Applied Optics, vol. 42, No. 8, Mar. 10, 2003, pp. 1409-1416.

Saleh et al., Fundamentals of Photonics, Wiley, Aug. 1991.

White, Long Optical Paths of Large Aperture, Journal Optical Society America, vol. 32, May 1942, pp. 285-288.

White, Very Long Optical Paths in Air, Journal Optical Society America, vol. 66, No. 5, May 1976, pp. 411-416.

Yen et al., Operation of a Numerical Optical Data Processor, 1980, SPIE vol. 232, International Optical Computing Conference, 1980, pp. 160-167.

U.S. Appl. No. 11/182,111, Final Office Action, mailed Sep. 3, 2008, 16 pages.

U.S. Appl. No. 11/184,535, Notice of Allowance and Fee(s) Due and Notice of Allowability with Examiner's Statement of Reasons for Allowance, mailed Jan. 31, 2008, 6 pages.

U.S. Appl. No. 11/801,105, Non-final Office Action, mailed Apr. 29, 2008, 9 pages.

Amendment from U.S. Appl. No. 11/182,111 dated Mar. 3, 2009.

Office action from U.S. Appl. No. 11/801,105 dated Nov. 3, 2008.

Response to Office action from U.S. Appl. No. 11/801,105 dated Jul. 16, 2008.

* cited by examiner

US 7,633,670 B2

METHODS, SYSTEMS, AND DEVICES FOR STEERING OPTICAL BEAMS

CROSS REFERENCES TO RELATED APPLICATIONS

This application claims priority to U.S. Provisional Application Ser. No. 60/588,731 filed Jul. 16, 2004, which is incorporated by reference herein.

BACKGROUND

Steering an optical beam can be useful for both detecting and transmitting of information using an optical beam. However, many methods of steering an optical beam can require complex mechanical or electrical solutions. For example, steering an optical beam using a phased array approach can require a complex gimbal arrangement. Thus, there remains a need in the art for additional approaches to steering optical beams.

SUMMARY

In one embodiment, devices for steering an optical beam are provided. The devices comprise an array of array elements, at least one trap door in the array of array elements, and at least one optical element. At least one of the array elements in the array comprises an input array element that is arranged such that an input beam incident on the at least one input array element travels a light path from the input array element to the at least one optical element. The array of array elements and the at least one optical element are arranged such that the input beam subsequently travels between the array of array elements and the at least one optical element until the input beam is incident on the at least one trap door in the array of array elements.

In one embodiment, devices for steering optical beams are provided. The devices comprise an array of array elements, at least one optical element, and at least one trap door in the array of array elements arranged such that an input beam entering the array through the trap door is incident on the at least one optical element. The input beam incident on the at least one optical element travels between the at least one optical element and the array of array elements until the input beam is incident on an output array element in the array of array elements.

In one embodiment, spot inter-leaver devices are provided. The devices comprise an inter-leaver array having inter-leaver array elements and a plurality of inter-leaver optical elements. The inter-leaver array and the plurality of inter-leaver optical elements are arranged such that a first array of input beam positions having first dimensions is rearranged to a second array of input beam positions having second dimensions.

In one embodiment, methods for steering an optical beam an optical beam are provided. The methods comprise inputting an input light beam from at least one direction reflecting the input light beam between an array of array elements and a plurality of optical elements. At least one array element is arranged such that the input is directed to a particular array element in the array. The step of reflecting comprises reflecting the input light beam between the array and the plurality of optical elements such that the input light beam is reflects off of more than one of the array elements in the array.

BRIEF DESCRIPTION OF THE SEVERAL VIEWS OF THE DRAWINGS

The following detailed description of embodiments of the present invention can be best understood when read in conjunction with the following drawings, where like structure is indicated with like reference numerals and in which.

DETAILED DESCRIPTION OF EMBODIMENTS OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Figure 1:
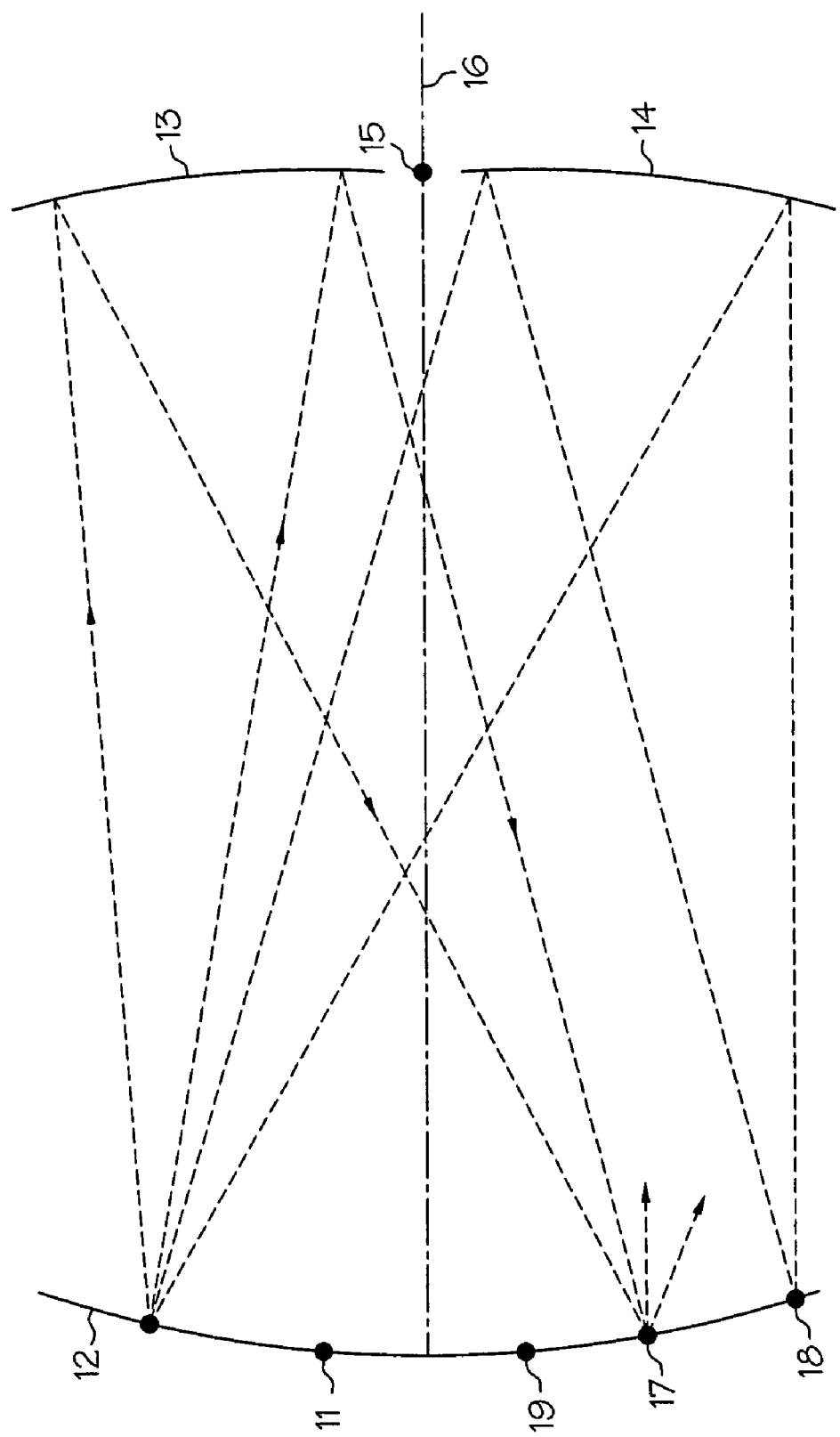
FIG. 1 is a top view of a traditional White cell.

The present invention utilizes the principles of the traditional White cell. FIG. 1 is a diagram of the path of a light beam passing through a traditional White cell. The White cell comprises three identical spherical mirrors, all of the same radius of curvature. The first mirror 12 is separated from the second 13 and third 14 mirrors by a distance equal to their radii of curvature. The center of curvature 15 of the first mirror lies on the centerline or optical axis 16 and falls between the second and third mirrors. The second and third mirrors are aligned so that the center of curvature 11 of the second mirror 13 and the center of curvature 19 of the third mirror 14 land on the first mirror, for example an equal distance from the optical axis. Light from the second mirror is imaged onto the third mirror, and vice versa. Light is input onto a spot 18 in the plane of but off the edge of the first mirror; the light beam is prepared so that it expands as it goes to the third mirror. The third mirror refocuses the beam to a point on the first mirror. The beam is then reflected to and expanded at the second mirror. The second mirror refocuses the light beam to a new spot 17 on the first mirror. At this point, the light may either exit the cell if the spot is off the edge of the first mirror, or continue to traverse the cell. The beam may traverse the cell a predetermined number of times, depending on the locations of the centers of curvature of the second and third mirrors.

Figure 2:
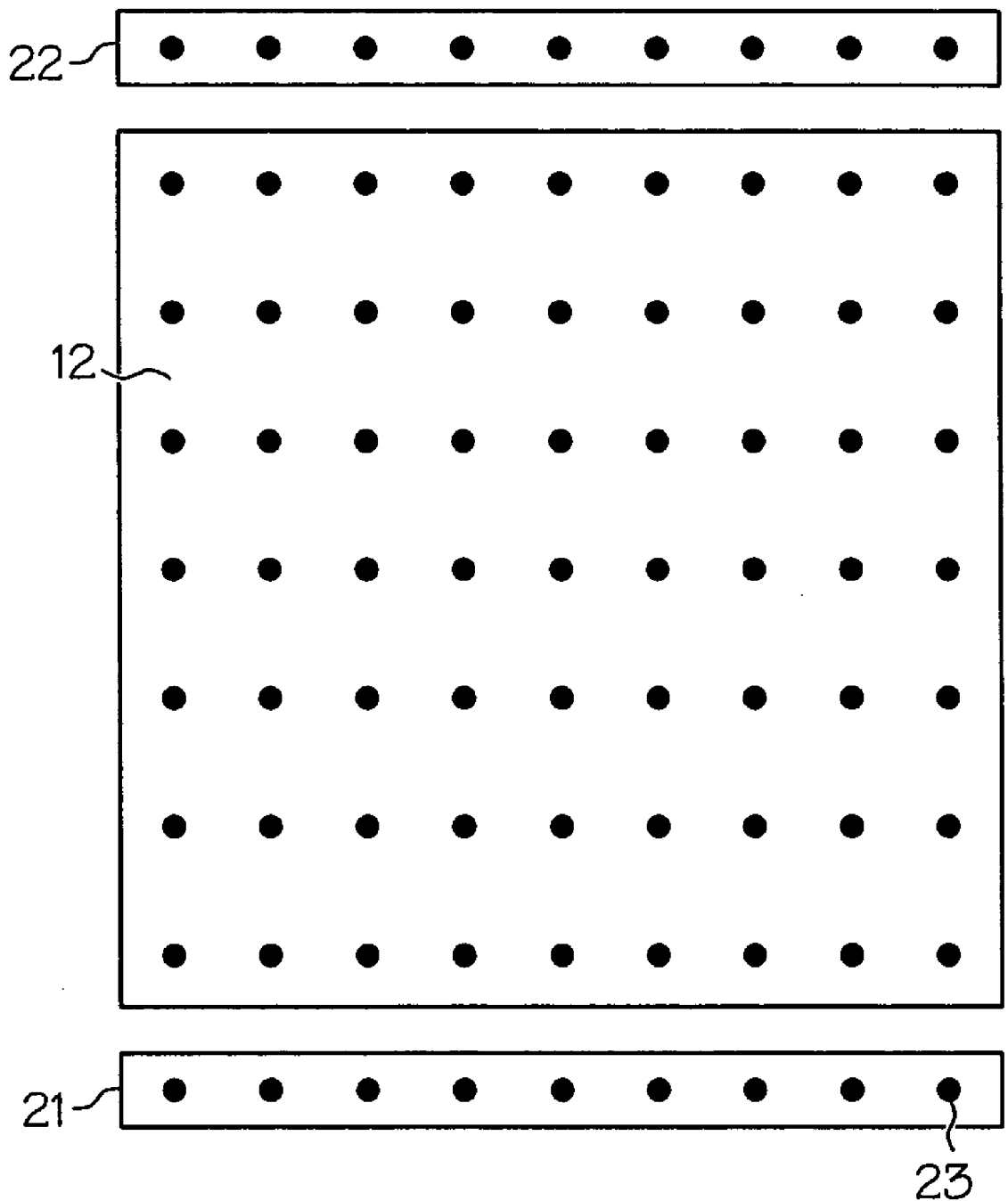
FIG. 2 is a front view of the spot pattern formed by a traditional White cell.

The angle of the input beam may be controlled by an input turning mirror 21, as shown in FIG. 2. The angle of the output beam may be controlled similarly by an output turning mirror 22. Each input of a light beam is shown by a spot 23 on the turning mirrors or the first mirror 12. Multiple light beams are shown, and multiple light beams can circulate through the cell at the same time. When many different beams are introduced, each one traces out unique spot pattern on the mirror 12. These beams do not interfere with each other. An arbitrary number of beams can be introduced with no effect. Each beam of light requires the same amount of time to navigate the cell. A beam of light may be reflected off the input turning mirror into the White cell, and may traverse the cell until the beam is directed to the output turning mirror, at which point it may exit the cell.

Figure 3:
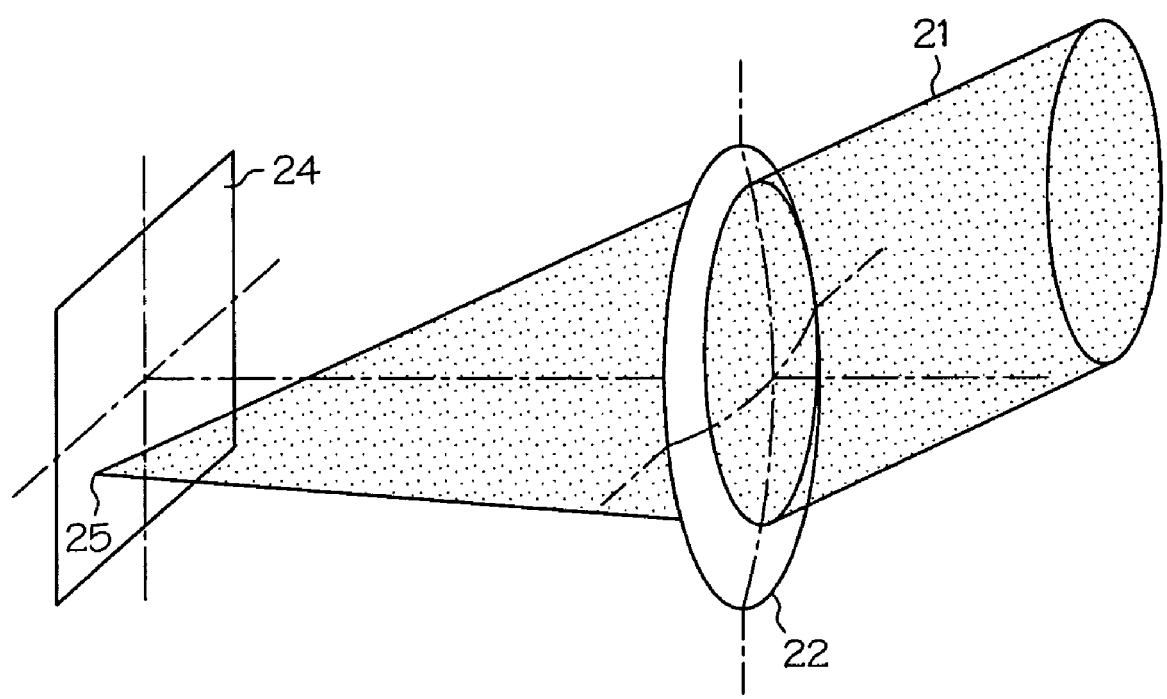
FIG. 3 is a plan view of an input beam in accordance with embodiments of the present invention.
Figure 4:
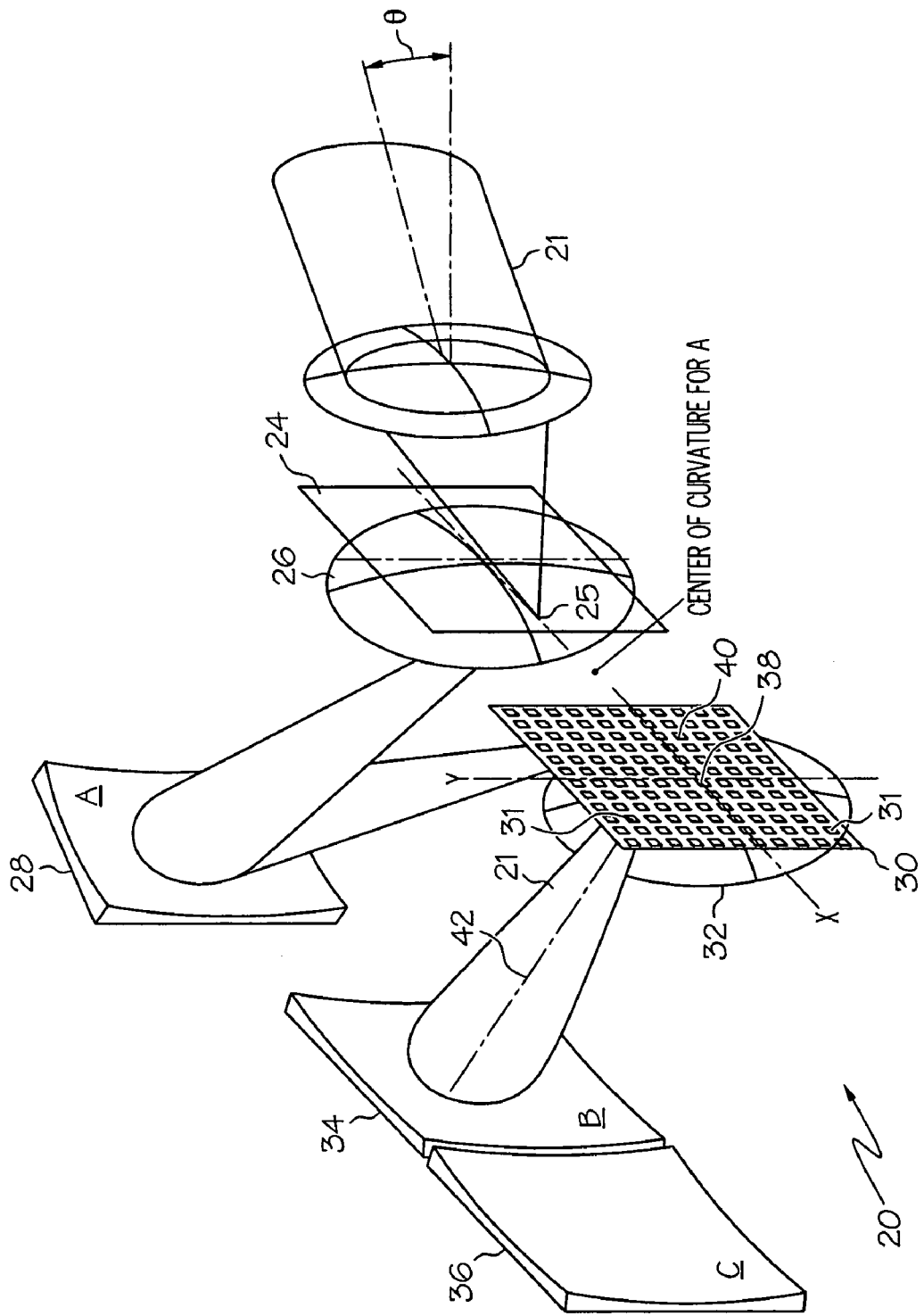
FIG. 4 is a plan view of an apparatus in accordance with embodiments of the present invention.

In accordance with embodiments of the present invention, devices for steering an optical beam are provided. Referring to FIGS. 3 and 4, a device 20 for steering an optical beam is illustrated. The device 20 has an array 30 of array elements 31, and at least one trap door 38 in the array 30. At least one of the array elements 31 comprises an input array element 40. The device additionally has first and second optical elements 34, 36. The input array element 40 is arranged such that an input beam 21 incident on the at least one input array element 40 travels a light path 42 from the input array element 40 to one of the first or second optical elements 34, 36. The array 30 of array elements 31 and the first and second optical elements 34, 36 are arranged such that the input beam subsequently travels between the array 30 of array elements 31 and the first and second optical elements 34, 36 until the input beam 21 is incident on the at least one trap door 38 in the array 30 of array elements 31. This arrangement will be described in greater detail herein.

The first and second optical elements 34, 36 can be any suitable optical elements. For example, the first and second optical elements 34, 36 can be spherical mirrors. In another example, the first and second optical elements 34, 36 can be replaced with the optical elements of a Herriot cell, or by a roof prism as discussed in U.S. Pat. No. 6,266,176. It will be understood that the first and second optical elements 34, 36 can be replaced with any suitable arrangement for producing the necessary spot pattern for a given input beam as discussed further herein.

In one embodiment, as illustrated in FIGS. 3 and 4, the input light beam 21 enters the device through an input lens 22. As can be seen in FIGS. 3 and 4, the input lens 22 transforms the light beam 21 into a point source 25 in an arbitrary location on the focal plane 24 of the lens. This point source 25 is then inputted to the array 30 in any suitable manner. For example, a field lens 26 and input optical element 28, such as a spherical mirror, can image the focal plane 24 to the array 30.

Figure 5:
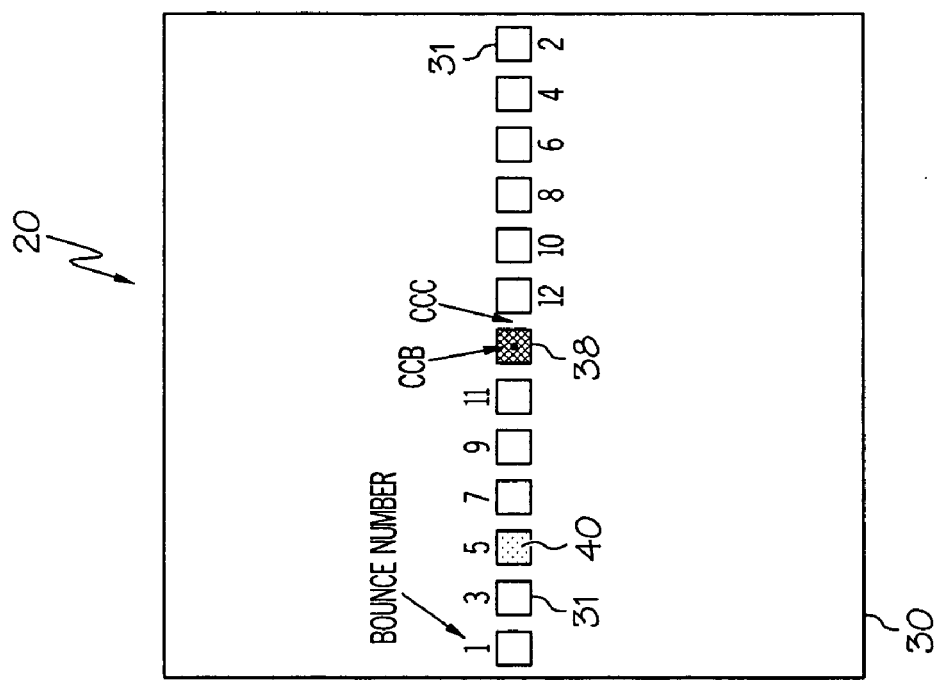
FIG. 5 is a front view of an array in accordance with embodiments of the present invention.

In one embodiment, the input light beam 21 is nearly plane, and the array 30 comprises a row of array elements 31 as illustrated in FIG. 5. The input beam 21 is incident on the input lens 22, and a spot 25 is created somewhere on the focal plane 24 of the lens. In this example, the input beam 21 arrives along a straight line on the focal plane 24 of the lens 22 such that the spot 25 is imaged on the straight line on the focal plane 24. The input beam 21 passes through the focal plane 24 and a field lens 26, and travels to the input mirror 28. Input mirror 28's center of curvature is located to one side of the focal plane 24, and the entire focal plane 28, which contains somewhere within it the spot 25, is re-imaged to the array 30. The array 30 can include a field lens 32 arranged such that the first optical element 34 images onto the second optical element 36 and the second optical element 36 images onto the first optical element 34.

It will be understood that array 30 can be any suitable array. In one example, the array 30 comprises an array of small mirrors 31, each of which can be tipped to some angle or left flat. It will be further understood that other types of spatial light modulators can function as the array 30.

For a given angle of the input beam 21, it is known where the spot created by the input beam 21 will land on the array 30. The array element 31 at that location is operated such that it directs the light coming from the input mirror 28 to the first optical element 34 or the second optical element 36, and the array element 31 that is operated in this manner functions as the input array element 40. In one example, the array element 31 that is operated in this manner can be a mirror that is tipped at some angle to direct the input beam 21 to the first or second optical element 34, 36 as appropriate. Each other array element 31 in the array 30 is not operated. For example, each other array element 31 can comprise mirrors that remain flat, as illustrated in FIG. 5. The first and second optical elements 34, 36 and the array 30 now form a White cell, with its concomitant spot patterns. However, the input beam 21 has arrived somewhere in the middle of the spot pattern.

For example, as illustrated in FIG. 5, the input beam 21 can arrive at the array element 31 labeled "5." As indicated, the array element 31 at position "5" has been operated to act as the input array element 40 so the light goes to the first optical element 34. For example, the array element 31 at position "5" can be tipped so that light goes to the first optical element 34. The first optical element 34 images the input beam 21 to the array element 31 labeled "6," which is an equal and opposite distance from the first optical element's 34 center of curvature, labeled CCB. The array element 31 labeled "6" is not operated. The light beam 21 is subsequently reflected to the second optical element 36. This spot pattern will continue to develop as the light beam 21 travels between the array 30 and the first and second optical elements 34, 36. Eventually the input beam 21 will progress to the array element 31 that comprises a trap door 38. For purposes of describing and defining the present invention, the term "trap door" shall be understood as referring to an array element that does not reflect the a beam to one of the optical elements. In one example, the trap door 38 can be a detector or an aperture through which the input beam 21 passes. The trap door could also be a tipped mirror, a prism, a grating, or other device that causes the beam to exit the system such that it no longer strikes elements 34 and 36.

It is noted that input beams 21 on the left half of the focal plane 24 in FIG. 4 will appear on one of the odd-numbered array elements 31 in FIG. 5, and these odd-numbered array elements 31 can be arranged such that the light goes next to the first optical element 34. However, if the input beam 21 is imaged on the right half of the focal plane 24, it will arrive on one of the even-numbered array elements 31 of FIG. 5, which can be arranged such that the input beam 21 goes next to the second optical element 36. Thus, in either case, the spot pattern progresses normally from whatever its particular starting point.

Figure 6:
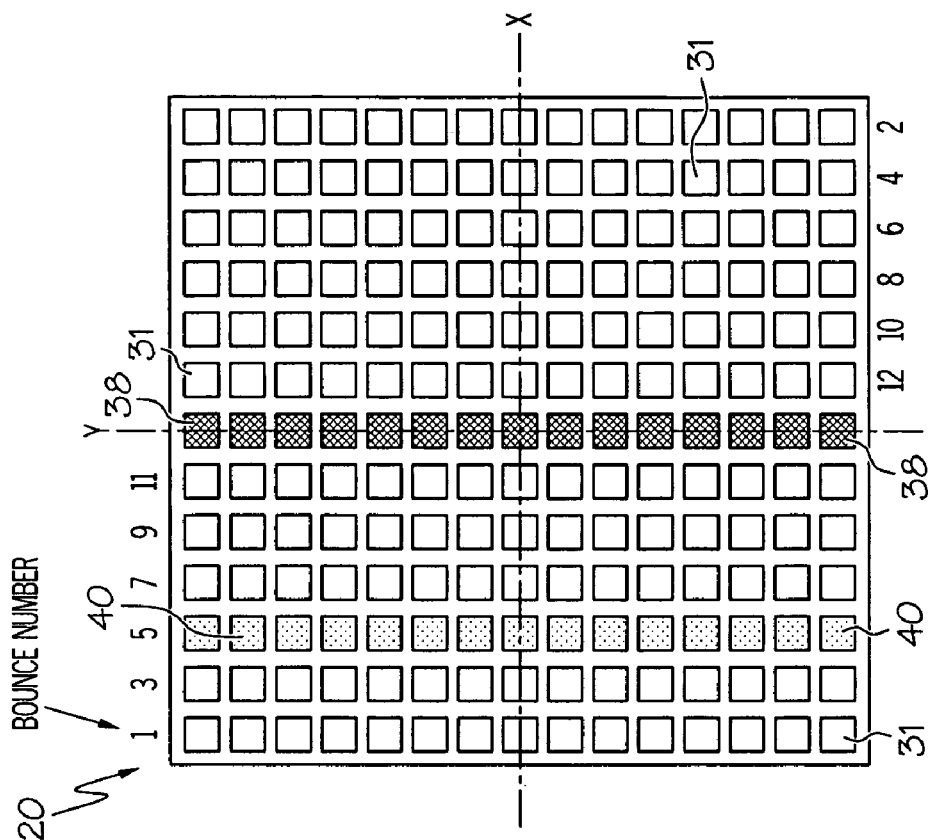
FIG. 6 is a front view of an array in accordance with embodiments of the present invention.

In another embodiment, two devices can be combined. The first device can be used to condense all points in a row to a single point. Another device can be used to condense all points in a column. Referring to FIGS. 4 and 6, a device 20 is illustrated that has rows and columns of array elements 31 in the array 30. Additionally, one of the columns in the array 30 comprises a column of trap doors 38. The input beam 21 can arrive anywhere on the focal plane 24. For example, the angle in the x-z plane could be θ. In this instance, it is expected that the input beam 21 will arrive in the column of array elements 31 labeled "5" but in an unknown row.

Each array element 31 in column "5" is operated to direct the input beam 21 to the first optical element 31, thus forming input array elements 40. All the other array elements 31 in the array 30 are not operated. For example, the array elements 31 in column "5" can comprise mirrors that are tipped, and the other array elements 31 can comprise mirrors that remain flat. Generally, the middle column in the array 30 comprises a column of trap doors 38. The input beam 21 will progress through the rest of its spot pattern along the row of array elements 31 on which the input beam 21 lands by traveling between the array 30 and the first and second optical elements 34, 36. The input beam 21 will continue along the row of array elements 31 until the input beam 21 is incident on one of the trap doors 38 located along the y-axis. That trap door 38 location corresponds to the angle in the y-z plane from which the beam is arriving. After passing through the trap door, the input beam 21 is directed to a device 20 as discussed with regard to FIG. 5 such that the input beam 21 is steered to a particular location, which can comprise a second trap door.

Figure 7:
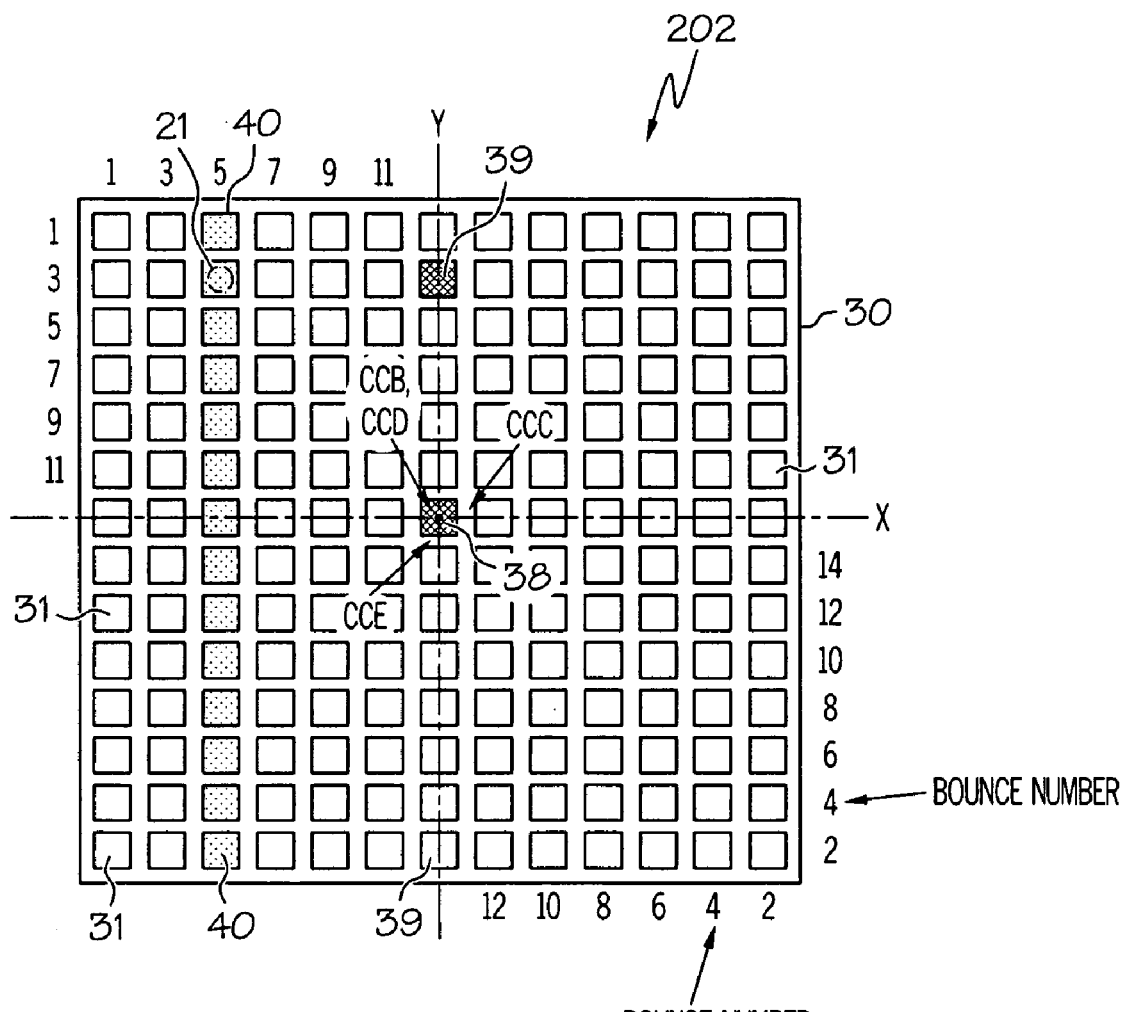
FIG. 7 is a front view of an array in accordance with embodiments of the present invention.
Figure 8:
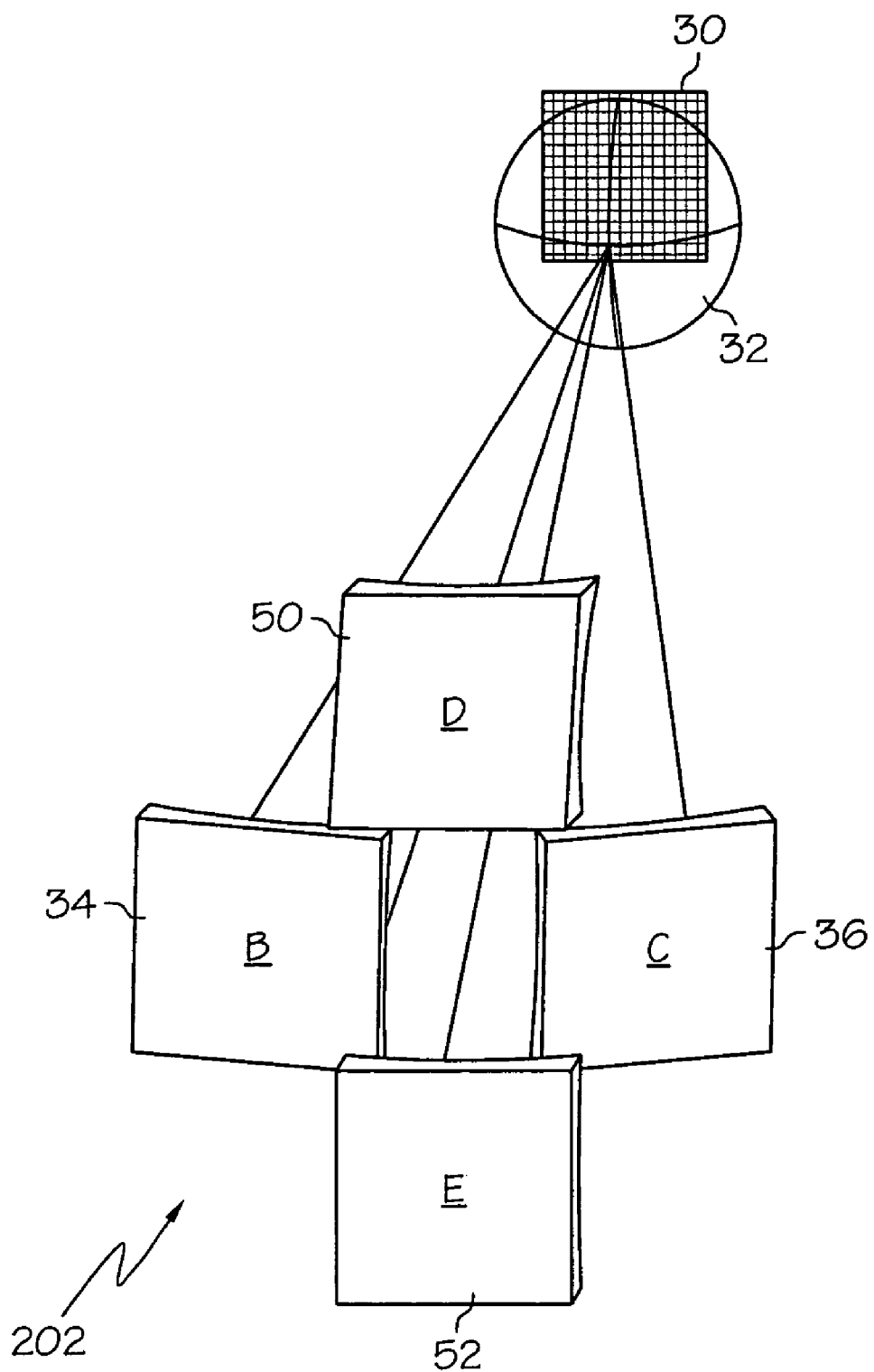
FIG. 8 is a plan view of an apparatus in accordance with embodiments of the present invention.

In another embodiment, a device 202 is provided that can condense all points in the array 30 to a single row, column location. Referring to FIGS. 7 and 8, the device 202 has first and second optical elements 34, 36 arranged to form a White cell with the array 30. Additionally, the device 202 has third and fourth optical elements 50, 52 arranged to form a second White cell with the array 30. The array 30 has rows and columns of array elements 31. The array 30 has a column of switching array elements 39, and the column of switching array elements 39 is generally the center column of the array.

The third and fourth optical elements 50, 52 can be any suitable optical elements. For example, the third and fourth optical elements 50, 52 can be spherical mirrors. In another example, the third and fourth optical elements 50, 52 can be replaced with the two optical elements of a Herriot cell. In another example, the third and fourth optical elements 50, 52, can be replaced by a roof prism as discussed in U.S. Pat. No. 6,266,176. It will be understood that the third and fourth optical elements 50, 52 can be replaced with any suitable arrangement of optical elements for producing the necessary spot pattern for a given input beam as discussed further herein In one example, the input beam arrives at position (x,y). The array elements 31 in the $x^{th}$ column are all operated to send input beam 21 to the first or second optical element 34, 36 as appropriate. For example, the array elements 31 in the $x^{th}$ column can be mirrors that are tilted left or right. Regardless of which row of the array 30 the input beam 21 arrives in, it will eventually progress through the spot pattern by traveling between the array 30 and the first and second optical elements 34, 36 and appear in the center column of the array 30 having switching array elements 39. The switching array elements 39 in this center column can be variably operated to send the input beam 21 to one of the third or fourth optical elements 50, 52. For example, the switching array elements 39 can be mirrors that are tilted up or down. The switching array element 39 in the row on which the input beam 21 is imaged from the first or second optical elements 34, 36 can be tilted to switch the input beam 21 to the third and fourth optical elements, while the rest of the switching elements 39 remain flat.

For example, if the input spot 21 comes from a direction corresponding to the third row of the array 30 illustrated in FIG. 7, the switching array element 39 is tipped and the input beam 21 goes to the third optical element 50. The third and fourth optical elements 50, 52 form a White cell with the array the input beam 21 progresses through its spot pattern along the column until it is incident on the trap door 38

It will be understood that the input beam 21 can enter the device 20 from any suitable distance and in any suitable direction. It will be further understood that the input lens 22 can be of any suitable size. For example, the input lens 22 can be 30 cm in diameter. Additionally, the focal plane 24 can be of any suitable size. For example, the focal plane 24 can be 30 cm in diameter. It will be further understood that the array elements can be of any suitable size. In one example, the size of the array elements 31 is chosen based on the diameter of the input lens, the focal plane and the required resolution required to resolve the direction of arrival of the input lens. For example, if the input lens 22 is 30 cm in diameter, the focal plane 24 is also 30 cm in diameter, and if the direction of arrival of the input beam 21 must be resolved to 1 part in $10^4$ in the x and y directions of the array 30, then the array elements 31 should be on a 30 µm pitch. Additionally, the array 30 would need to be 30 cm on a side and have $(10^4)^2=10^6$ array elements 31. This is a very large array 30. In another example, two devices 20 can be cascaded, but each of the two arrays 30 would still need to have 30 µm array elements 31 but with a $1\times10^4$ aspect ratio. This is a difficult aspect ratio to achieve.

In another embodiment, spot inter-leavers are provided that can break very long columns of spots into smaller 1-dimensional spot arrays, and align them side-by-side in a two-dimensional array of more reasonable size. These spot inter-leavers can reduce the size required for the arrays 30 in the steering devices and methods discussed above.

Figure 9:
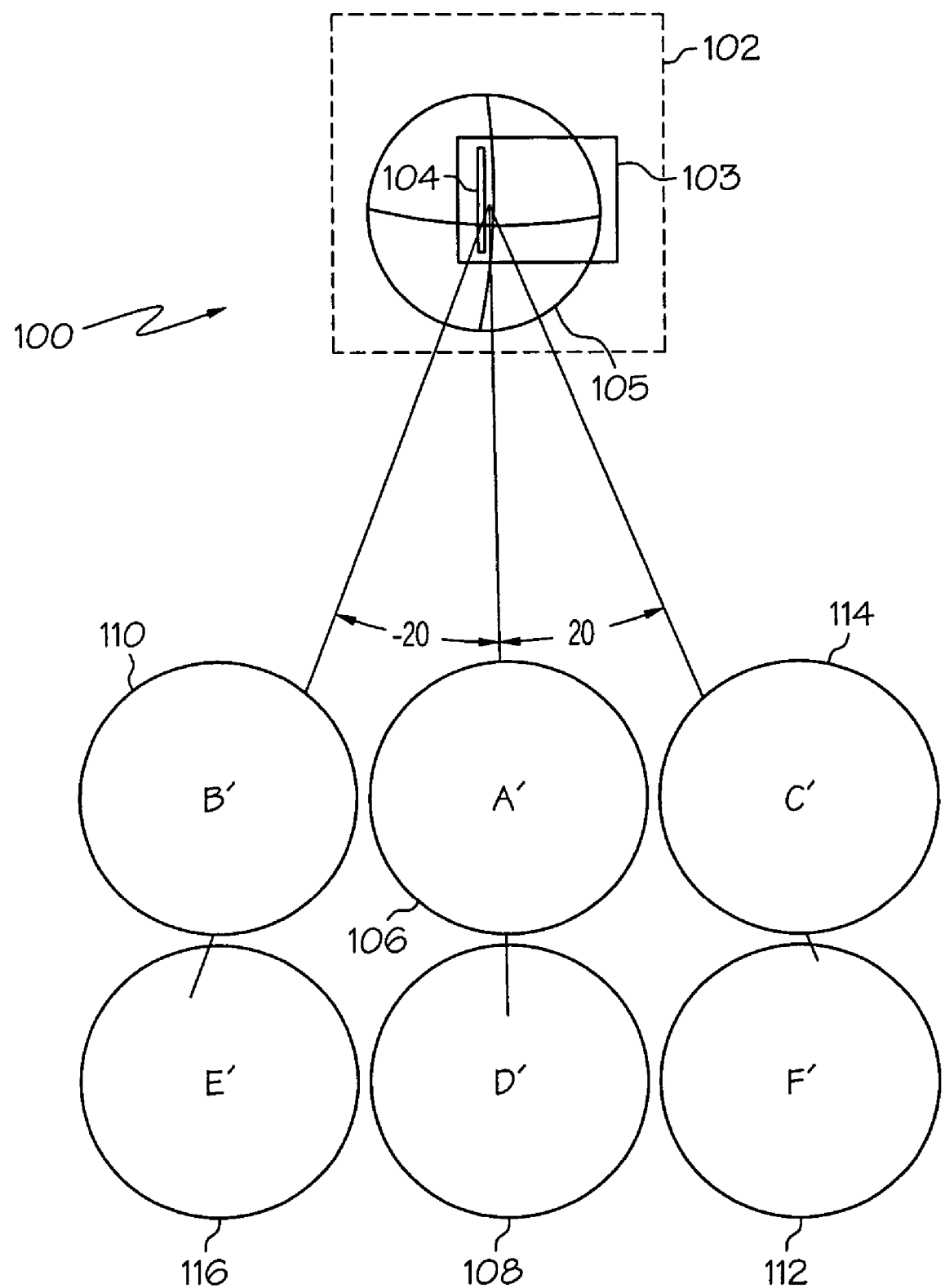
FIG. 9 is a plan view of an apparatus in accordance with embodiments of the present invention.
Figure 10:
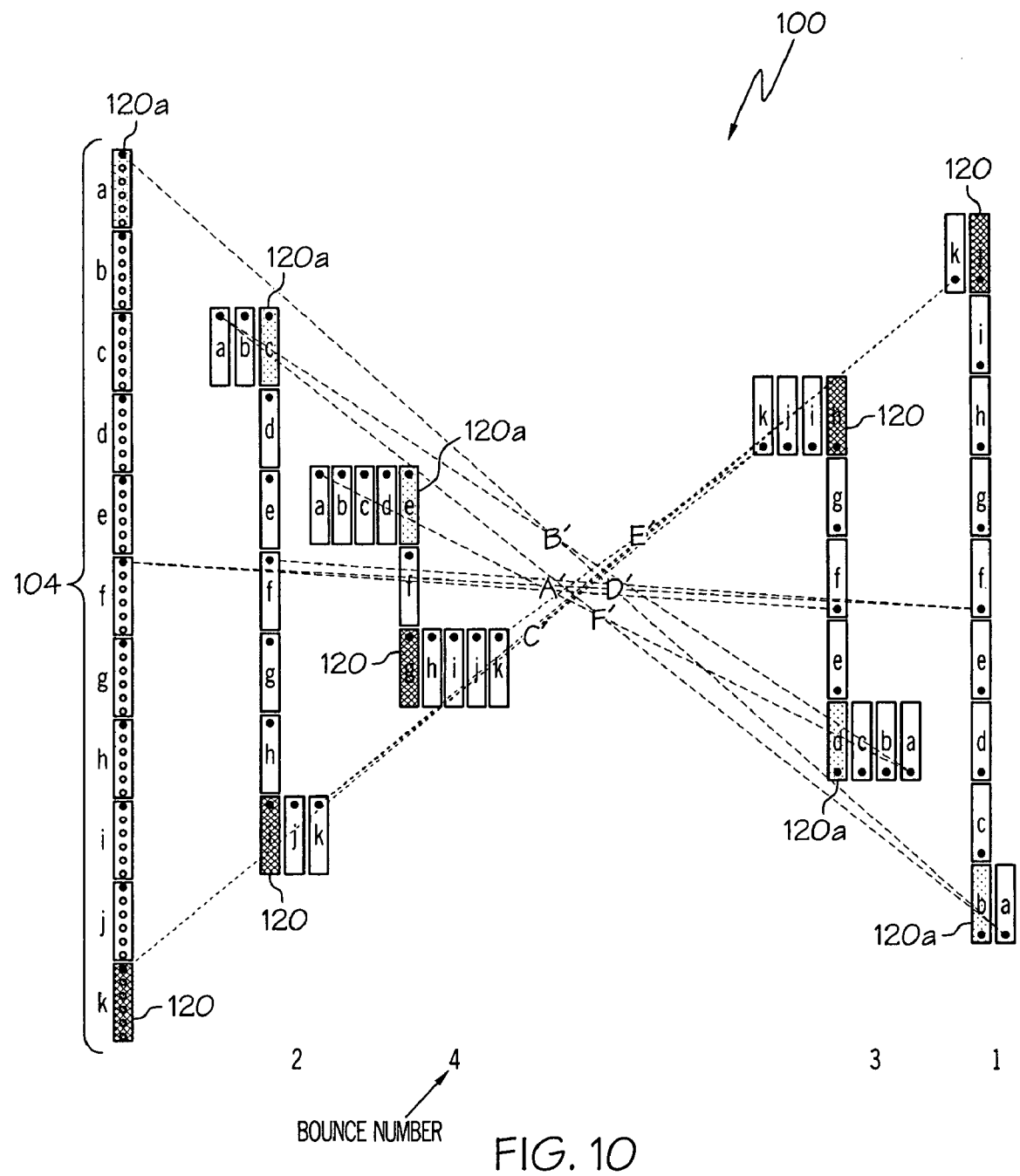
FIG. 10 is a front view of an array in accordance with the present invention.
Figure 11:
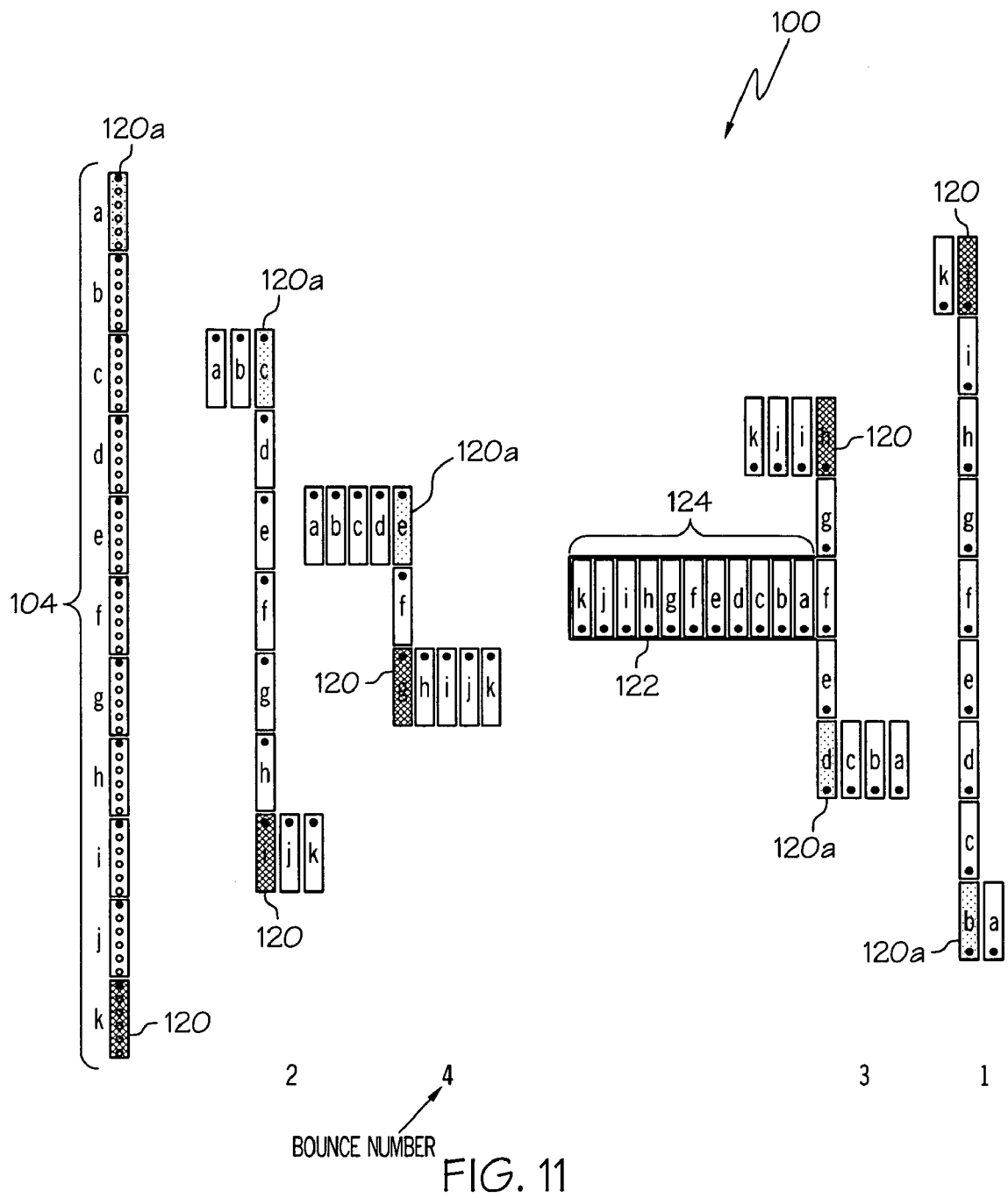
FIG. 11 is a front view of an array in accordance with the present invention.

Referring now to FIGS. 9-11, a spot inter-leaver 100 is illustrated. The spot inter-leaver 100 is illustrated based on a 1-dimensional receiving aperture, in which the light through the lens 22 of FIG. 3 forms a spot somewhere in a specific column. If the angular resolution is to be 1 part in $10^4$, then there are $10^4$ distinct spots in which the input beam 21 might arrive. It is generally desirable that the spot end up on the same final location regardless of its arrival location.

In FIG. 9, a spot inter-leaver device 100 is illustrated. The spot inter-leaver device has a focal plane 102 which can be the conjugate of the focal plane 24 of the input lens 22 as illustrated in FIG. 3. A first array of spots 104 comprising a single column arrives on the focal plane 102. This plane is either co-incident or conjugate to the field plane of a group of White cells formed by a plurality of inter-leaver optical elements. For example, the inter-leaver optical elements can comprise six objective mirrors 106, 108, 110, 112, 114, 116. The first and second inter-leaver optical elements 106, 108 form a White cell with the field plane 102 having a field mirror 103 in the focal plane 102 and a field lens 105. Additionally, the third and fourth inter-leaver optical elements 110, 112 form a White cell with the field mirror 103 and the field lens 105. Finally, the fifth and sixth inter-leaver optical elements 114, 116 form a White cell with the field mirror 103 and the field lens 105. Finally, each spot location at which it is desirable to switch from one White cell to another will have switching optical elements 120, such as small, tipped, and fixed micromirrors that will switch the input beams 21 from one White cell to another. When an input 21 beam needs to be switched to a different White cell, these switching optical elements 120 do the switching. The switching optical elements 120 are passive and do not change.

In FIG. 10, a single column array 104 of 66 spots is illustrated. In one example, these 66 spots represent 66 possible input beam positions of the focal spot 25 of FIG. 3 along some vertical axis, corresponding to each of 66 different possible input directions. The array 104 can be mentally broken into 11 sub-arrays of 6 spots each, labeled a-k. The 66 possible input beams are incident on the focal plane 102 by some optics (not shown) such that after they reflect off the field mirror 103 they will be headed toward the first inter-leaver optical element 106. However, the top and bottom sub-arrays a and k have switching optical elements 120 and 120a in the area on which the input beams that correspond to sub-arrays a and k can be imaged. The top sub-array a has switching optical elements 120a tipped to −θ, and the bottom sub-array k has switching optical elements 120 tipped to +θ. All the other sub-array regions are incident on the field mirror 103.

The six spots that are in sub-array a land on the tipped switching optical elements 120a that send any spot landing in this region to the third inter-leaver optical element 110. The spots in the bottom sub-array, k, land on switching optical elements 120 that send any spot landing in this sub-array to the fifth inter-leaver optical element 114. All of the other spots in the sub-arrays b-j go to the first inter-leaver optical element 106 because they strike the plane field mirror 103. FIG. 10 locates the centers of curvature of each objective mirror with a label A'-F' as shown in FIG. 9.

The first inter-leaver optical element 106 re-images the spots in sub-arrays b-j to another column on the right hand side of the field mirror 103 on bounce 1. Sub-array "a," however, is re-imaged by third inter-leaver optical element 110 to lie in the same rows as sub-array b but one spot to the right, and similarly sub-array k is re-imaged by the fifth inter-leaver optical element 114 to the lie next to and to the left of sub-array j, as illustrated. The progress of a single spot from each sub-array is shown in FIG. 10.

Now, on the right hand side of the FIG. 10, a switching optical element 120a is placed in the area of bounce number 1 to which the spot from sub-array b is imaged. Thus, the switching optical element 120a is tipped at −θ. This spot is thus shifted from the first and second inter-leaver optical element 106, 108 White cell to the third and fourth inter-leaver optical element 110, 112 White cell. However, the spots under the image of sub-array a reflect on the field mirror 103, and light from the spots remains in the third and fourth inter-leaver optical element 110, 112 White cell. Thus, both sub-arrays a and b are subsequently imaged on bounce number 2 so that their spots form in the same rows but next to sub-array c. Similarly, a switching optical element 120 is placed in the area of bounce number 1 to which the spot from sub-array j is imaged. The switching optical element 120 is tipped at +θ. The spots in sub-array j are thus shifted from the first and second inter-leaver optical element 106, 108 White cell to the fifth and sixth inter-leaver optical element 114, 116 White cell. However, the spots under the image of sub-array k, reflect on the field mirror 103, and light from the spots remains in the fifth and sixth inter-leaver optical element 114, 116 White cell.

This process continues for the required number of bounces to line up the sub-arrays in the desired manner. FIG. 11 shows the final total spot pattern. At the end of the bounces, the sub-arrays are all lined up side by side to form an array of spots 124 having different dimensions than the first array 104. Next, a trap door 122 is placed in this central region as illustrated, covering the now rectangular array of spots 124. Thus the array of spots 124 can pass through to another device. This second device can be devices 20 as discussed above. The device 20 can be used to drive the input beam 21 (spot) from the inter-leaver device 100 to a single location, as described earlier, for detection or further processing as desired.

In the example illustrated in FIGS. 10 and 11, a 1×66 linear array 104 was reduced to an 11×6 2-D array of spots 124 in five bounces. It will be understood other linear array sizes can be reduced to rectangular arrays. In general, if the number of bounces is m, then a 1×N linear array of spots can be reduced to a (2m+1)×[N/(2m+1)] array with the appropriated spot inter-leaver. For example, a 1×1000 spot array could be converted into a 31×33 spot array in 15 bounces. All of the switching optical elements required are passive and can be coated with very high reflectivity coatings. Thus, the loss in the spot inter-leaver for 15 bounces is about 0.1 dB. The 2-dimensional array, now 32×33, can be condensed to a single point as described herein.

In yet other embodiments, the process described above with respect to FIGS. 3-11 can be reversed to transmit an optical beam. For example, an input beam 21, such as a laser beam carrying the information to be transmitted, can enter the device 202 as described with respect to FIGS. 3, 7, and 8 via the trap door. In this instance the input beam 21 circulates in the device, this time with the input beam 21 moving outward, until the input beam 21 is in the desired final location. At least one of the array elements comprises an output array element 40 that can be operated to send the input beam 21 out of the device. It will be understood that the other devices 20 described herein can be similarly used to transmit an optical beam. In one embodiment, the input beam 21 can subsequently enter a spot inter-leaver 100 as described above with respect to FIGS. 9-11. The input beam 21 enters the spot inter-leaver somewhere in the trap door region 122 of FIG. 11. The precise location at which the input beam 21 enters the spot inter-leaver 100 is chosen to such that after going through the spot inter-leaver 100 in the reverse direction from that described above, the input beam 21 ends up at the desired position in a single column of spots 104. From this position, the input beam expands on its way to the input lens 22 of FIG. 3, which is now an output lens 22, producing a nearly plane wave propagating in the desired direction.

It will be obvious to those skilled in the art that various changes may be made without departing from the scope of the invention, which is not to be considered limited to what is described in the specification.

What is claimed is:

1. A device for steering an optical beam, comprising:
   an array of array elements;
   at least one trap door in the array of array elements; and
   at least one optical element, wherein at least one of the array elements in the array comprises an input array element that is arranged such that an input beam incident on the at least one input array element travels a light path from the input array element to the at least one optical element, and wherein the array of array elements and the at least one optical element are arranged such that the input beam subsequently travels between the array of array elements and the at least one optical element until the input beam is incident on the at least one trap door in the array of array elements.

2. The device as claimed in claim 1 wherein the at least one optical element is selected from a spherical mirror and a roof prism.

3. The device as claimed in claim 1 wherein the at least one input array element comprises an array element that is capable of tilting.

4. The device as claimed in claim 1 wherein the array comprises an array of mirrors capable of tilting.

5. The device as claimed in claim 1 wherein the at least one trap door is selected from one of a detector and an aperture.

6. The device as claimed in claim 1 further comprising an input lens arranged such that an input beam forms a point on the focal plane of the input lens prior to the input beam being incident on the at least one input array element.

7. The device as claimed in claim 1 wherein:
the array of array elements comprises a row of array elements;
the row of array elements has a trap door in the row, and wherein the at least one optical element comprises first and second optical elements; and
the row of array elements and the first and second optical elements are arranged such that the input beam travels between the row of array elements and the first and second optical elements until the input beam is incident on the trap door.

8. The device as claimed in claim 1 wherein:
the at least one optical element comprises first and second optical elements;
the array of array elements comprises more than one row of array elements and more than one column of array elements;
one of the columns of array elements comprises trap doors;
one of columns of array elements comprise input array elements arranged such that an input beam incident on one of the input array elements travels to one of the first and second optical elements; and
the array of array elements and the first and second optical elements are arranged such that the input beam subsequently travels between one of the rows of array elements and the first and second optical elements until the input beam is incident on one of the trap doors in the column of array elements comprising trap doors.

9. The device as claimed in claim 1 further comprising third and fourth optical elements, wherein:
the at least one optical element comprises first, second, third, and fourth optical elements;
the array of array elements comprises more than one row of array elements and more than one column of array elements;
at least one of the columns of array elements comprise input array elements arranged such that an input beam incident on one of the input array elements travels to one of the first and second optical elements; and
one of the columns of elements comprises switching array elements that are variably operable such that an input beam incident on one of the switching array elements travels to one of the third and fourth optical elements;
one of the switching array elements comprises a trap door;
the array of array elements and the first and second optical elements are arranged such that the input beam incident on one of the input array elements subsequently travels between one of the rows of array elements and the first and second optical elements until the input beam is incident on one of the switching array elements; and
the input beam incident on one of the switching array elements travels to one of the third or fourth optical elements and subsequently between the column of switching array elements and the third and fourth optical elements until the input beam is incident on the trap door.

10. The device as claimed in claim 1 further comprising a spot inter-leaver device comprising:
an inter-leaver array having inter-leaver array elements; and
a plurality of inter-leaver optical elements, wherein the inter-leaver array and the plurality of inter-leaver optical elements are arranged such that a first array of possible input beam positions having first dimensions is rearranged to a second array of possible input beam positions having second dimensions, and wherein the spot inter-leaver is arranged such that an input beam is incident on the spot inter-leaver before the input beam is incident on the input array element.

11. A device for steering an optical beam, comprising:
an array of array elements;
at least one optical element;
at least one trap door in the array of array elements arranged such that an input beam entering the array through the trap door is incident on the at least one optical element, wherein the input beam incident on the at least one optical element travels between the at least one optical element and the array of array elements until the input beam is incident on an output array element in the array of array elements.

12. The device as claimed in claim 11 wherein the at least one optical element comprises first and second optical elements.

13. The device as claimed in claim 11 further comprising third and fourth optical elements, wherein:
the array of array elements comprises more than one row of optical array elements and more than one column of array elements;
one of the columns of array elements comprises switching array elements that are variably operable such that an input beam incident on the switching array element travels a light path to one of the third and fourth optical elements;
the array of array elements and the first and second optical elements are arranged such that the input beam incident on the trap door subsequently travels between one of the rows of array elements and the first and second optical elements until the input beam is incident on the switching array element; and
the input beam incident on the switching array element travels to one of the third or fourth optical elements and subsequently between the column of switching array elements and the third and fourth optical elements until the input beam is incident on the output array element.

14. The device as claimed in claim 11 further comprising an output lens arranged such that an input beam that is incident on the output array element is directed through the output lens and propagates a plane wave in a desired direction.

15. The device as claimed in claim 14 further comprising a spot inter-leaver device comprising:
an inter-leaver array having inter-leaver array elements; and
a plurality of inter-leaver optical elements, wherein the inter-leaver array and the plurality of inter-leaver optical elements are arranged such that a first array of possible input beam positions having first dimensions is rearranged to a second array of possible input beam positions having second dimensions, and wherein the spot inter-leaver is arranged such that an input beam that is incident on the output array element is incident on the spot inter-leaver before the input beam is incident on the output lens.

16. The device as claimed in claim 15 wherein the location of the output array element is chosen such that the input beam enters the inter-leaver array at a desired position such that the plane wave propagates in a desired direction.

17. A spot inter-leaver device comprising:
an inter-leaver array having inter-leaver array elements; and
a plurality of inter-leaver optical elements, wherein the inter-leaver array and the plurality of inter-leaver optical elements are arranged such that a first array of input beam positions having first dimensions is rearranged to a second array of input beam positions having second dimensions.

18. The device as claimed in claim 17 wherein the inter-leaver array elements comprise fixed mirrors, and wherein selected mirrors in the inter-leaver array are tipped to direct selected ones of the input beam positions in the first array to a desired one of the plurality of inter-leaver optical elements.

19. The device as claimed in claim 17 wherein the plurality of inter-leaver optical elements comprises:
first and second inter-leaver optical elements arranged to form a first White cell with the inter-leaver array;
third and fourth inter-leaver optical elements arranged to form a second White cell with the inter-leaver array; and
fifth and six inter-leaver optical elements arranged to form a third White cell with the inter-leaver array.

20. The device as claimed in claim 19 wherein selected inter-leaver array elements are arranged to switch input beams from one of the White cells to another one of the White cells.

21. The device as claimed in claim 17 wherein the inter-leaver array and the plurality of inter-leaver optical elements are arranged such that an input beam at each of the input beam positions bounces between the inter-leaver array and the plurality of inter-lever optical elements. m times, and wherein the first array has first dimensions of 1×N and the second array has second dimensions of (2m+1)×[N/(2m+1)], where N is the number of input beam positions.

22. A method for steering an optical beam, comprising:
inputting an input light beam from at least one direction; and
reflecting the input light beam between an array of array elements and a plurality of optical elements, wherein the array includes at least one trap door that outputs the input light beam and at least one array element is arranged such that the input is directed to a particular array element in the array, and wherein the step of reflecting comprises reflecting the input light beam between the array and the plurality of optical elements such that the input light beam reflects off of more than one of the array elements in the array.

23. The method as claimed in claim 22 further comprising receiving an input light beam with an input lens prior to the step of inputting the input light beam.

24. The method as claimed in claim 22 further comprising outputting the input light beam to an output lens after the step of reflecting the input light beam between an array of array elements and a plurality of optical elements.

25. The method as claimed in claim 22 further comprising receiving an input light beam on a spot inter-leaver and directing the light beam to a desired spot in the spot inter-leaver, wherein the snot inter-leaver changes the dimensions of the input light beam.

26. A method for steering an optical beam, comprising:
inputting an input light beam from at least one direction; and
reflecting the input light beam between an array of array elements and a plurality of optical elements, wherein the array includes at least one trap door and at least one array element is arranged such that the input is directed to a particular array element in the array, and wherein the step of reflecting comprises reflecting the input light beam between the array and the plurality of optical elements such that the input light beam reflects off of more than one of the array elements in the array, wherein the step of reflecting the input light beam comprises reflecting the input light beam between an array of array elements and first and second optical elements, wherein the array of array elements comprises a row of array elements, and wherein the desired array element in the row of array elements comprises a first trap door.

27. A method for steering an optical beam, comprising:
inputting an input light beam from at least one direction; and
reflecting the input light beam between an array of array elements and a plurality of optical elements, wherein the array includes at least one trap door and at least one array element is arranged such that the input is directed to a particular array element in the array, and wherein the step of reflecting comprises reflecting the input light beam between the array and the plurality of optical elements such that the input light beam reflects off of more than one of the array elements in the array, wherein the step of reflecting the input light beam comprises reflecting the input light beam between an array of array elements and first and second optical elements, wherein the array of array elements comprises at least one column of array elements and at least one row of array elements, and wherein the desired array element in the array elements comprises a first trap door through which the input light beam passes.

28. The method as claimed in claim 27 further comprising reflecting the input light beam after it passes through the first trap door between a second array of second array elements and third and fourth optical elements until the input light beam is incident on a desired second array element, wherein the second array of second array elements comprises a row of array elements, and wherein the desired second array element in the row of array elements comprises a second trap door.

29. A method for steering an optical beam, comprising:
inputting an input light beam from at least one direction; and
reflecting the input light beam between an array of array elements and a plurality of optical elements, wherein the array includes at least one trap door and at least one array element is arranged such that the input is directed to a particular array element in the array, and wherein the step of reflecting comprises reflecting the input light beam between the array and the plurality of optical elements such that the input light beam reflects off of more than one of the array elements in the array, wherein the step of reflecting the input light beam comprises reflecting the input light beam between an array of array elements and a first and second optical elements, wherein the array of array elements comprises a row of array elements and a column of array elements, and wherein at least one array element in the array comprises a switching array element, and further comprising reflecting the input light beam between the array of array elements and third and fourth optical elements such that the input beam is directed to the desired array element.

* * * * *

UNITED STATES PATENT AND TRADEMARK OFFICE
CERTIFICATE OF CORRECTION

PATENT NO. : 7,633,670 B2
APPLICATION NO. : 11/184536
DATED : December 15, 2009
INVENTOR(S) : Anderson et al.

It is certified that error appears in the above-identified patent and that said Letters Patent is hereby corrected as shown below:

In column 11, line 66, the word "snot" should read --spot--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,633,670 B2  Page 1 of 1
APPLICATION NO. : 11/184536
DATED : December 15, 2009
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 705 days.

Signed and Sealed this

Ninth Day of November, 2010

David J. Kappos
*Director of the United States Patent and Trademark Office*